US009870719B1

(12) United States Patent
Watkins et al.

(10) Patent No.: US 9,870,719 B1
(45) Date of Patent: Jan. 16, 2018

(54) APPARATUS AND METHOD FOR WIRELESS SOUND RECOGNITION TO NOTIFY USERS OF DETECTED SOUNDS (71) Applicant: Hz Innovations Inc., Rochester, NY (US)

(72) Inventors: Greyson Kendall Watkins, Rochester, NY (US); Zachary Baltzer, Hilton, NY (US); Nicholas Lamb, Waterloo, NY (US)

(*) Notice: Subject to any disclaimer, the term of this patent is extended or adjusted under 35 U.S.C. 154(b) by 0 days.

(21) Appl. No.: 15/489,195

(22) Filed: Apr. 17, 2017

(51) Int. Cl.
| G09B 21/00 | (2006.01) |
| H04R 29/00 | (2006.01) |
| H04R 3/00 | (2006.01) |
| G10L 25/51 | (2013.01) |
| G10L 15/02 | (2006.01) |
| G10L 25/21 | (2013.01) |
| G10L 21/0208 | (2013.01) |
| H04W 76/02 | (2009.01) |
| H04W 88/02 | (2009.01) |

(52) U.S. Cl.
CPC ............ G09B 21/009 (2013.01); G10L 15/02 (2013.01); G10L 21/0208 (2013.01); G10L 25/21 (2013.01); G10L 25/51 (2013.01); H04R 3/00 (2013.01); H04R 29/00 (2013.01); H04W 76/02 (2013.01); H04W 88/02 (2013.01)

(58) Field of Classification Search
CPC ... G09B 21/009; G10L 15/02; G10L 21/0208; G10L 25/21; G10L 25/51; H04R 3/00; H04R 29/00; H04W 76/02; H04W 88/02

USPC .......... 381/56, 315; 704/231, 232, 236, 202; 701/9
See application file for complete search history.

(56) References Cited

U.S. PATENT DOCUMENTS

| 4,952,931 | A | 8/1990 | Serageldin |
| 6,910,013 | B2 | 6/2005 | Allegro et al. |
| 8,488,799 | B2* | 7/2013 | Goldstein ............... H04R 29/00 381/122 |
| 8,504,360 | B2 | 8/2013 | Pedersen |
| 8,918,343 | B2 | 12/2014 | Mitchell |
| 2007/0299671 | A1 | 12/2007 | McLachlan |
| 2009/0010466 | A1 | 1/2009 | Haikonen |
| 2009/0196431 | A1* | 8/2009 | Gregg ................... B01J 19/0006 381/56 |
| 2013/0039497 | A1* | 2/2013 | Ramalho ............... H04R 1/2834 381/56 |
| 2013/0039499 | A1* | 2/2013 | Patenaude ............ G08B 25/009 381/56 |

(Continued)

Primary Examiner — David Ton
(74) Attorney, Agent, or Firm — Dinsmore & Shohl LLP (57) ABSTRACT

The described examples provide for a sound recognition and notification process and apparatus that provides a notification to a hearing impaired person via a portable device in response to the recognition of a selected sound. A processor of the sound notification apparatus is configured to compare the detected sound data to a model for recognition. If the sound data matches the model, features are extracted from the detected sound data and used by the processor to generate reference data, e.g. an updated sound model. The reference is retained in a memory of the apparatus to facilitate subsequent sound recognition without having to rely upon an external device for analysis. Recognition of a sound, based on a substantial match to stored reference data, may trigger transmission of a notification message indicating an occurrence of the corresponding sound.

23 Claims, 5 Drawing Sheets

(56) References Cited

U.S. PATENT DOCUMENTS

2015/0043737 A1\* 2/2015 Abe .................. G10L 25/48
                                                    381/56
2015/0106095 A1   4/2015 Mitchell
2015/0112678 A1   4/2015 Binks
2016/0163168 A1\* 6/2016 Brav ............... G08B 13/1672
                                                    381/56

\* cited by examiner

APPARATUS AND METHOD FOR WIRELESS SOUND RECOGNITION TO NOTIFY USERS OF DETECTED SOUNDS

BACKGROUND

Different sound recognition systems have attempted to provide notifications to hearing impaired users after a sound has been recognized. For example, sound recognition systems have been developed to help the hearing impaired identify the presence of emergency vehicles and detect sounds in the environment. However, these systems require powerful processing devices to model and successfully recognize a sound in the environment where the hearing-impaired person needs assistance. As a result, the systems in proximity to the hearing-impaired person may need to communicate with more powerful processing devices and/or systems some distance away from the hearing-impaired persons. For example, the prior systems may detect sounds around the hearing impaired person, but must send the detected sound data to an external system, such as a cloud-based or Internet-based server, that processes the sound data to recognize the detected sound. The external system returns the recognition result to either the detection system or another device. However, the communication between devices and through different networks requires time as well as reliable connections between the sound detection system and the remote server and back to the detection system or to another device for providing a notification that may require transmission through yet another type of network.

SUMMARY

The detailed description below and the accompanying drawings disclose examples of an apparatus that includes a housing, a wireless transceiver, a memory, a sound detection circuit, and a processor. The processor, the memory, the sound detection circuit and the wireless transceiver are coupled together within the housing.

The wireless transceiver is configured to communicate via a first radio frequency communication protocol. The sound detection circuit is configured to detect a sound in an area of a premises in which the apparatus is located, and generate sound data based on the detected sound. The memory stores programming instructions and one or more simplified sound models. The processor may be coupled to the sound detection circuit, the wireless transceiver and the memory. The processor when executing the programming instructions is configured to establish a communication path with a portable device via the wireless transceiver. The processor identifies the portable device as at least one intended recipient device to receive notifications from the apparatus when the apparatus is in a sound recognition mode. The processor sends, via the communication path, a request to the portable apparatus requesting selection of an exigent sound of interest to a hearing-impaired person. Upon receiving from the portable device an exigent sound selection in response to the request, the processor retrieves a pre-stored, simplified sound model corresponding to the exigent sound selection from the memory. The processor receives sound data generated by the sound detection circuit in response to the sound detected in the area of the premises in which the apparatus is located, and the generated sound data received from the sound detection circuit is compared to the retrieved, simplified sound model corresponding to the exigent sound selection. In response to a result of the comparison indicating that the generated sound data is similar to the simplified sound model corresponding to the exigent sound selection, features are extracted from the generated sound data. The extracted features are stored in the memory as reference sound data for the selected exigent sound; and the apparatus enters a sound recognition mode to monitor the area of the premises in which the apparatus is located to recognize an occurrence of a subsequent exigent sound that, based on the reference sound data, is similar to the selected exigent sound.

Examples of a method are also disclosed. A method example includes establishing a communication path between a portable device and a sound notification apparatus via a wireless transceiver of the sound notification apparatus. In response to receiving by the sound notification apparatus a selection of an exigent sound, a pre-stored, simplified sound model corresponding to the selected exigent sound is retrieved from a memory of the sound notification apparatus. Sound data generated by the sound detection circuit in response to detecting a sound in an area of a premises where the sound notification apparatus is located is received. A processor of the sound notification apparatus compares the generated sound data to the retrieved simplified model. In response to a result of the comparison indicating that the generated sound data is similar to the simplified model, features are extracted from the generated sound data. The features extracted from the generated sound data are stored in the memory as reference sound data for the selected exigent sound. The sound recognition mode is entered to monitor an area of a premises to recognize a subsequent occurrence of a exigent sound that, based on the reference sound data, is similar to the selected exigent sound.

Another example that is disclosed is an example of a sound notification apparatus. The sound notification apparatus includes a housing, a wall plug, a wireless transceiver, a sound detection circuit, a memory, and a processor. The wireless transceiver, the sound detection circuit, the memory, and the processor are coupled within the housing. The wall plug is coupled to the housing, and configured to be inserted into an electrical outlet from which the apparatus receives electrical power. The wireless transceiver is configured to communicate via a first radio frequency communication protocol. The sound detection circuit may be configured to detect a sound in an area in which the apparatus is receiving electrical power, and generate sound data based on the detected sound. The memory stores programming instructions and a set of simplified sound models. The processor when executing the programming instructions stored in the memory establishes a communication path with a portable device via the wireless transceiver to conduct a sound notification apparatus setup. A selection of an exigent sound of interest to a hearing-impaired person for the sound notification apparatus setup is requested. In response to receiving a sound selection, a simplified sound model of the selected sound is retrieved from the set of simplified sound models stored in the memory. The simplified sound model includes an area of a premises in which the selected sound is most probable to occur. The sound data of a sound detected that exceeds a noise floor is sampled by the sound detection circuit. The sampled sound data is compared to the retrieved simplified model of the selected sound. In response to the comparison indicating a substantial match between the sampled sound data and the simplified model of the selected sound, features from the sampled sound are extracted that uniquely identify the sampled sound as the selected sound. The extracted features are stored in the memory. A sound recognition mode is entered to notify an identified device of detection of the selected sound based upon data generated from a subsequent sound substantially matching the extracted features of the unique identify the sampled sound as the selected sound. In response to detection of data generated from the subsequent sound substantially matching extracted features while in the sound recognition mode, a notification message is output indicating an occurrence of the selected sound for transmission to the identified device.

BRIEF DESCRIPTION OF THE DRAWINGS

The drawing figures depict one or more implementations in accordance with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

A need exists for an improved apparatus that selectively detects a sound of interest as compared to ambient noise in the environment, uses a processor within the apparatus without reliance on any external apparatus for sound processing, and that delivers a notification to an intended recipient based on recognition of a particular sound detected in a monitored area. The various examples disclosed herein relate to a system that facilitates providing a reliable recognition result based on the specific sound expected to be detected in the area and the communication of a notification to an identified device.

In addition, sound characteristics of the detected sound are stored as reference data at the location of the sound notification apparatus. In the example, the use of sound characteristics of the detected sound provides reference data that effectively is customized based on the sound actually received at the sound notification apparatus. As a result, the possibility for error (both false negative detections as well as false positives) is reduced since the reference data is based on the actual sound within a installation area of the sound notification apparatus as opposed to a universal sound model as in the prior art. As a result, acoustics in the monitored area, intensity of sound from a particular source in the area, dialect and/or vernacular differences of exigent sounds may be accounted for through this use of the customized sound detection reference data.

Reference now is made in detail to the examples illustrated in the accompanying drawings and discussed below.

Figure 1:
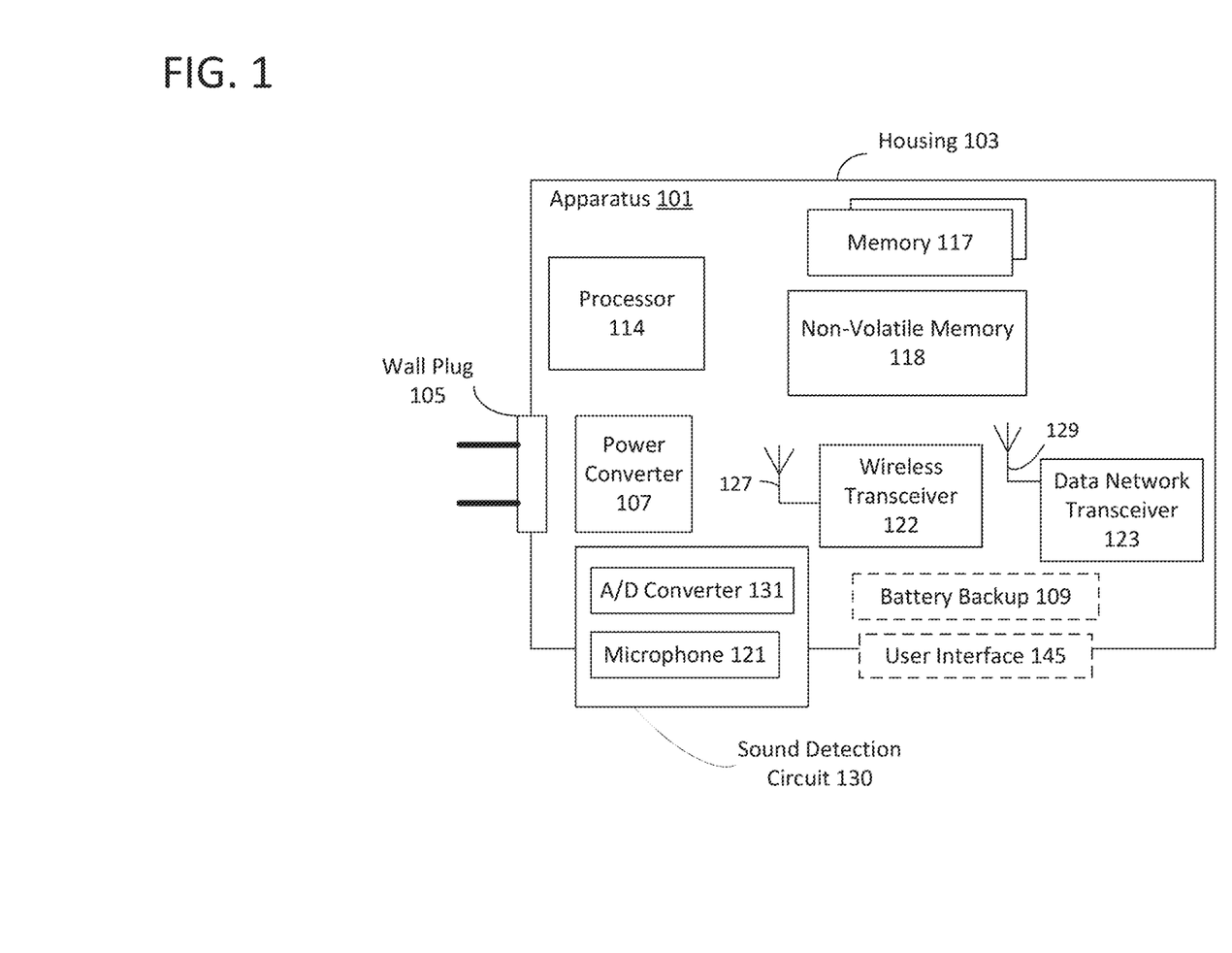
FIG. 1 is a high-level functional block diagram of an example sound notification apparatus that provides detection and sound recognition processing in support of an example of the notification service for the hearing impaired.

FIG. 1 is a high-level functional block diagram of an example sound notification apparatus 101 that provides detection and sound recognition processing in support of an example of the notification service for the hearing impaired.

The sound notification apparatus 101 includes a housing 103, a wall plug 105, a wireless transceiver 122, a data network transceiver 123, a sound detection circuit 130, a memory 117, 118, and a processor 114.

The wall plug 105 is coupled to the housing 103 and configured, for example, with prongs or tines to be inserted into an electrical outlet, such as a common 110V household receptacle or the like, from which the sound notification apparatus 101 receives electrical power. A power converter 107 may be coupled to the wall plug 105 and be configured to convert the input voltage into a voltage usable by the electrical circuits, components and devices (e.g., wireless transceiver 122 and data network transceiver 123). A benefit of using power supplied by the location in which the sound notification apparatus 101 is located is that the processor 114 is able to have the processing power to perform the needed sound recognition processes and analysis without having to require processing assistance from devices external, such as a connected server, another computer, or a network server, to the sound notification apparatus 101.

As explained in the following example, an advantage of the sound notification apparatus 101 is that it is configured to autonomously, without relying on another computer or processing device for any assistance, detect, analyze and recognize a sound, and then notify a user device based on the recognition result. At least one reason that this advantage is provided is due to the apparatus having a dedicated power supply provided by the wall plug 105. The sound notification apparatus 101 may optionally have a backup battery supply 109 having sufficient power to enable reduced processing of the detected sounds to provide a recognition result and a resultant notification and/or to support operations for a short period during a power outage. Another reason, discussed in more detail later, for the noted advantage, is the use of customized reference data stored locally in a memory of the sound notification apparatus 101.

The wireless transceiver 122 is configured to communicate through the antenna 127 via a first radio frequency communication protocol. The first radio frequency communication protocol may be, for example, Bluetooth®, ZigBee or other wireless communication protocols. The data network transceiver 123 may be configured to couple to a wireless access point (not shown in this example) for connection to a data communication network, such as a local area network, the Internet, a cellular communication network or the like. The data network transceiver 123 may communicate via a wired or wireless communication path with the access point. For example, a wired communication path may be an Ethernet cable, a coaxial cable, a power line (used with a power line communication system) or the like. Alternatively or in addition, a wireless communication path may be established through the antenna 129. Regardless of whether a wired or wireless communication path is used, the data network transceiver 123 may be communicate with a data network (not shown in this example) and/or devices (also not shown) connected to the data network via a second radio frequency communication protocol, such as Wi-Fi, ZigBee, Li-Fi, RF home networking protocol or cellular communication protocol, such as LTE.

The sound detection circuit 130 that may include a microphone 121 and an analog-to-digital (A/D) converter 131. The sound detection circuit 130 is configured to detect a sound. In response to the detected sound, the sound detection circuit 130 may generate sound data. For example, the microphone 121 may be an electret microphone, which uses a thin membrane that vibrates and 'wiggles' the power line to which the thin membrane is connected, in direct relation to the received airwaves. In more detail, an amplifier (not shown) having a predetermined gain or selectable gain may receive an analog sound signal generated by the microphone 121 responsive to detect sound and amplify the sound signal, for example, by about 300%, or approximately 50 dB. The amplified sound signal may be filtered to remove, for example, all frequencies below approximately 100 Hz and above approximately 15 kHz. The filtered sound signal is applied to an analog to digital (A/D) converter 131. The A/D converter 131 may be configured, for example, to have a 12 bit resolution at 44100 samples a second. Alternatively, some or all of the filtering and/or amplification may be implemented in the digital domain (after A/D conversion) via a suitably configured digital processing circuit. The digitized sound data is provided to the processor 114 for analysis and sound recognition. The processor 114 may receive the sound data to determine whether the sound signal has at least a predetermined sound energy in an area (e.g., sound floor) in which the apparatus is receiving electrical power. The sound data that exceeds the predetermined sound energy, or sound floor, may be collected in batches having, for example, a duration of approximately 1 second, for further processing. Although shorter durations, such as 250, 500 or 750 milliseconds and/or longer durations, such as 1.25 or 1.50 seconds may be used.

The memory 118 is shown as a non-volatile memory, and may store programming instructions and a simplified sound model. The memory 117 may act as a memory buffer that temporarily stores the sound data generated based on the detected sound from the microphone 121.

The processor 114 may be coupled to the housing 103, the microphone 121, the wireless transceiver 122, the data network transceiver 123 and the memory 117. These elements of the sound notification apparatus 101 are enclosed in or otherwise coupled to the housing 103 in that they are integral components of the sound notification apparatus 101 at the location of the sound notification apparatus 101 (e.g. where the apparatus is installed), as opposed to separate elements at remote location(s) that communicate with the sound notification apparatus 101.

When executing the programming instructions stored in the memory 118, the processor 114 may be configured to perform a number of functions. Examples of the functions the processor 114 is configured to perform may now be described with reference to the flowcharts of FIGS. 2 and 3.

Figure 2:
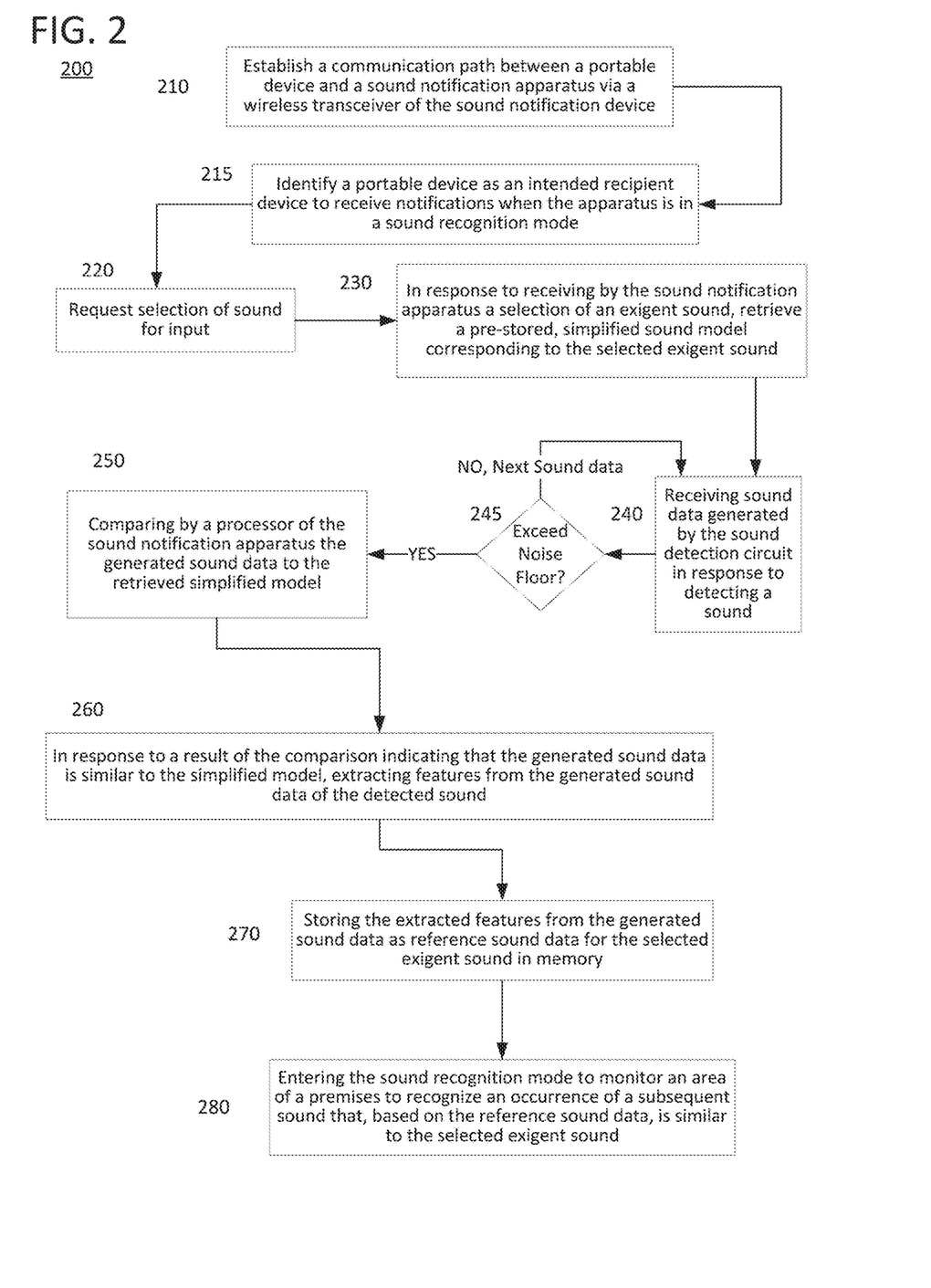
FIG. 2 is a flow chart of a high-level example of process for configuring a sound notification apparatus to recognize a selected sound.

The process 200 of FIG. 2 may include steps that configure the sound notification apparatus for detection of sound selected by a user and for identifying devices that are to receive notifications in response to a recognition of the selected sound. The sound notification apparatus receives electrical power upon being plugged into an electrical outlet. As mentioned above with reference to FIG. 1, the sound notification apparatus is equipped with a wireless transceiver, such as a Bluetooth transceiver. A portable device also equipped with a Bluetooth transceiver pairs with the sound notification apparatus.

In the process 200, for example, at 210, a communication path is established between a sound notification apparatus and a portable device via a wireless transceiver, such as a Bluetooth transceiver, of the sound notification apparatus. The communication path may be established, for example, according to a known pairing protocol, such as Bluetooth, or the like.

Upon successfully establishing a communication path with a portable device via the wireless transceiver, i.e., pairing with the portable device, a computer application that allows the sound notification apparatus to collect information from the portable device user may be launched on the portable device. For example, the sound notification apparatus may prompt the user of the portable device to access an on-line store (e.g., an "app" store) to download a computer application associated with the sound notification apparatus. The computer application may generate prompts to a user interface of the portable device. One of the prompts generated by the computer application may be, for example, a request for logon information related to a local area network in a premises that will permit the sound recognition device access to the local area network as well as a data communication network, such as the Internet or a cellular network. In addition, upon establishing the communication path via the wireless transceiver, the computer application on the portable device may provide information related to the area in which the sound notification apparatus is located, which is received by the sound notification apparatus, such as 101 of FIG. 1, for further processing. For example, the area related information may be used by the sound notification apparatus processor to select a simplified sound model from the set of simplified sound models. The simplified sound model may be predetermined multipliers, or weights, for input into a neural network that are representative of a general version of an exigent sound. For example, the simplified sound model for a doorbell may have a set of predetermined multipliers that provide an acceptable similarity value (e.g., 80% recognition) for hundreds of different doorbell sounds.

The sound notification apparatus, at 215, may generate prompts on the portable device requesting identification of a portable device as at least one intended recipient device to receive notifications from the apparatus when the apparatus is in a sound recognition mode. The identified portable device will receive notifications from the sound notification apparatus. One or more portable device may be identified as a recipient device. For example, the identified recipient device may be the same portable device communicating with the sound notification apparatus in step 210, a different device or may be combinations of multiple devices.

The sound notification apparatus may request at 220 selection of an exigent sound of interest to a hearing-impaired person. An exigent sound may be a sound that a person in a premises should be aware that the sound occurred, and that may perhaps require an immediate response, the sound may be a non-speech sound such as a doorbell, a person's scream, a telephone ringtone, an alarm bell, glass breaking, metallic crunch, a dog bark, another animal sound (e.g., yelping, meowing, whinnying or the like), a siren, an air horn or the like, as well as a word spoken under duress, such as "help", "fire", "police", "fireman", variations of "ouch", the name of a person that is screamed or shouted (e.g., "Mommy!," "Daddy!), or the like. In addition, the sound of interest may include an identifier of the sound and an area of a premises in which the selected exigent sound of interest is most probable to occur, such as a foyer, nursery, kitchen, garage, patio area, or the like.

The sound notification apparatus may send the request to the portable device executing the sound notification apparatus application. In response to the request, the portable device may present an input menu on a GUI of a number of different sounds (e.g., baby crying, doorbell, repeated dog barking, a person's scream or the like) or category of sounds (e.g., household noises (e.g., doorbell), person noises (e.g., scream, baby crying and like), non-person noises (e.g., dog barking, horn beeping, lawn mowers, sirens and the like) enabling a user to input a selected sound for comparison to a set of simplified sound models.

A memory of the sound notification apparatus may store programming instructions and a set of simplified sound models. In the sound recognition mode, a memory buffer, which may or may not be part of the memory, may temporarily store sound data generated based on the detected sound.

In response to receiving a selection of a exigent sound or sound category from the portable device, the sound notification apparatus may retrieve from the sound notification memory a pre-stored, simplified model corresponding to the selected exigent sound (230). The simplified sound model may include an area of a premises in which the selected sound is most probable to occur. For example, doorbells are typically installed in a foyer or another room near an entryway. The simplified sound model may include additional sound-related information such as foyer, entry way or the like. The area designator may be used by the user during set up for selection of all exigent sounds that may occur in a particular area, not just the obvious sounds like a doorbell. A non-obvious sound may be the sounds of the door knob turning or the door unlocking, without warning, such as from a knock or advance notice of a visit from a visitor. The selected sound model corresponding to the selected exigent sound may be retrieved, for example, from the set of simplified models stored in the memory. The user may then cause the exigent sound to be produced, for example, if the selected sound is a doorbell or a knock on a door, the user may produce the selected sound, i.e., actuate the doorbell by pressing the doorbell button, or by knocking on the door. The sound detection circuit of the sound notification apparatus may detect the sound. The sound notification apparatus processor may receive the sound data generated by the sound detection circuit in response to detecting a sound (240) and may generate sound data. At 245, the sound notification apparatus processor, based on an analysis of the sound data, may determine whether the received sound exceeds a noise floor.

At this time, it may be helpful to provide an example as how the noise floor is established as the noise floor may change based on the location of where the sound notification device is located. For example, quieter locations (e.g., a nursery) may have a lower noise floor while noisier locations such as a location close to or in a laundry room or a utility room, may have a higher noise floor. The noise floor value is a minimum sound energy value that is equal to a predetermined sound energy value. The noise floor may be determined based on an output from the sound detection circuit. For example, when determining the noise floor, the sound detection circuit may detect sound for a predetermined time period, such as twenty (20) seconds, thirty (30) seconds or the like. Using the sound data generated during the predetermined time period, the processor may, for example, calculate an average sound energy, determine a median sound energy, or the like. Using, for example, the average sound energy, the processor may determine the predetermined sound energy value at which the noise floor is set by scaling the average sound energy. The average sound energy value may be scaled using, for example, a scaling value of approximately 1.1-2.0 depending upon the location (e.g., a nursery versus a foyer or inside of an automobile) of the sound notification apparatus. In some examples, the noise floor scaling value may be, for example, approximately 1.3, while in other examples in areas where noise is generally louder, the noise floor scaling value may be, for example, approximately 1.6 or higher. Of course, other values may be appropriate depending upon the noise in a particular area. After application of the scaling value, the predetermined sound energy value representing the noise floor is set. In this example, the noise floor is based upon the calculated average sound energy that is multiplied by a scaling factor.

For example, the sound notification apparatus processor may provide an indication, such as an LED indicator light indication, such as a green light, that the produced sound was of sufficient intensity and/or duration (i.e., the noise floor is exceeded). Conversely, the indicator may be a red LED light indicating that the sound did not exceed the noise floor.

It may be appropriate at this time to describe the analysis of the sound data generated by the sound detection circuit. In a more detailed example of the sound data analysis that occurs on the sound notification apparatus, the data collection and analytics performed by the processor may be multithreaded. For example, after approximately one (1) second the sound data stored in an incoming memory buffer is forwarded to an analysis memory buffer. The sound data in the analysis memory buffer is extracted and split into approximately 60 blocks of approximately 1024 samples each with an approximately 50% overlap. For example. block 1 has samples 1 through 1024 and then block 2 has samples 512 through 1536 (block 2 shares approximately 50% of its samples with block 1), and so on.

Each sample block of the 1024 samples is passed through a standard feature block. A Fast Fourier Transform (FFT) or the like is applied to the feature block. The FFT converts the waveform into frequency bands in a format similar to a spectrogram. The process may use, for example, triangular overlapping windows to obtain the power of the spectra in each of the frequency bands. For example, each triangular filter allows for combining frequencies that are close to one another, and may return one (1) number representative of the power inside the band. Using this number, the processing device determines whether the detected sound has exceeded the noise floor. In an example, the FFT is used differently in this analysis. Instead of using the frequency axis as is typical, the FFT is converted into a mel scale axis to allow the band power to be determined, and hence, to more readily determine whether the detected sound exceeds the noise floor. For example, the windows generated by the triangular filtering are applied to the generated mel scale axis values to determine the whether the power inside the band from the detected sound exceeds the noise floor.

If the noise floor is exceeded, the process 200 proceeds to step 250; otherwise, the process 200 returns to 240 and waits to receive sound data generated by the sound detection circuit for further analysis at 245.

At 250, the sound notification apparatus processor compares the generated sound data received from the sound detection circuit to the retrieved simplified model of the selected sound. In response to a result of the comparison indicating that the generated sound data is similar to the simplified model, the processor at 260 extracts features from the generated sound data of the detected exigent sound. For example, when the processor is extracting features, the processor may identify features of the sampled sound related to at least one of the attack of the generated sound data, the decay of the generated sound data, tracking of the frequency of the generated sound data, of the generated sound data. Of course, other features may also be extracted, such as the maximum sound intensity, overall duration of the sound or the like. The "attack" of a sound refers to changes in sound intensity occurring before the sound reaches its steady-state intensity or peak intensity. For example, the sound of a gunshot has a fast attack, while the sound of a piece of paper being slowly torn is a sound that has a slow attack. "Sustain" refers to the steady state of a sound at its maximum intensity or peak. Meanwhile, "decay" is the rate at which the sound fades to silence. The extracted features from the generated sound data may be stored as reference sound data for the selected exigent sound are stored in the memory at 270. In addition or alternatively, the extracted featured may be used to update the simplified model of the selected sound. For example, when updating the simplified model of the selected sound using the stored unique sound characteristics of the matching sound, the processor may incorporate the extracted features from the generated sound data of the detected exigent sound into the simplified model to produce a supplemented model that is stored in the memory. For example, the supplemented model may replace the simplified sound model of the selected sound in the set of simplified sound models. The supplemented model may further distinguish the generated sound data as the selected sound.

The sound notification apparatus enters a sound recognition mode to monitor an area of a premises to recognize an occurrence of a subsequent exigent sound that, based on the reference sound data, is similar to the selected exigent sound (280).

In addition, the process 200 may include searching using signals received from the wireless transceiver 122, such as a Bluetooth® transceiver, or the data network transceiver 123, such as signals from a local area network, such as a Wi-Fi network, for a device capable of receiving notifications of subsequent detection of the selected sound. The notification-capable device may be a device, other than the portable device used to in the process 200. For example, a first user may use the portable device of process 200 to configure the sound notification apparatus, such as 101 of FIG. 1, and identify another device, such as a device associated with a second user who is hearing impaired, as the notification-capable device. More detail regarding such an example will be provided in the discussion of FIG. 4 below.

It may be helpful to describe in more detail how the simplified sound models are generated by reference to a specific example such as a doorbell. In an example of the preprocessing that occurs prior to detecting any sounds in a user environment, approximately five hundred (500) doorbell samples of varying volume and duration may be collected. The 500 noise samples may be both placed in two (2) separate folders labeled Noise and Samples. The script then counts up each items inside the respective folders.

For each doorbell input sound sample, the doorbell sound of each doorbell input sound sample is imported and resampled, for example, at a number of samples per second, such as approximately 44100 samples/second. A Fast Fourier Transform of the sampled data may be calculated. The resampling confirms that the features of each sampled sound have substantially the same sampling frequency and FFT values. The pre-processing program may crop off any silence at the beginning and end of each of the respective doorbell samples to insure that only significant noise is in the doorbell samples. Each doorbell sample may be split into approximately one (1) second files. For example, if a doorbell sample is 3.3 seconds in duration, the doorbell sample is segmented into three (3) separate one (1) second files with, example, a 0.3 portion of the 3.3 second sample deleted. For example, the last 0.3 seconds of sound, the first 0.3 seconds, three 0.1 second portions of the entire sample, or the like may be deleted.

A noise file is retrieved from memory, and a noise sample is selected for further analysis. The selection of the noise file is determined based on threshold value, for example, the noise file may include data indicating that the sound intensity is 2 times the average sound energy of the noise sample. The selected noise file is also resampled at the same number of samples per second as the input sound, such as the doorbell sample, at, in the example, 44100 samples/second, and normalized to make the resampled noise file equal to the selected noise and input sound sample file.

This is looped for each noise file and each 1 second window of collected noise data. So if we had one (1) noise sound file that is 2 seconds long and 2 doorbell files of 3 seconds long, the number of files would equal 12 (3×2×2) files. Each noise file may have eight 8 different shifts applied to it before being added to each doorbell file. For example, noise is applied starting at 0 seconds and the doorbell starting at 0.4 seconds, and applied repeatedly, for example, for 8 iterations. For example, iterations may include the doorbell starting at 0 seconds and the noise starting at 0.4 seconds, in this example, up to ninety-six (96) files are created.

Each of these 96 files in this example may have, for example, 4 different volume offsets applied to the noise. For example, the volume offset may begin at a point at which the noise volume equals the doorbell volume, and then noise volume added may subsequently decrease slightly, then in a next iteration, decrease slightly further, and so on. As a result, there may be, for example, 384 (96×4) different files that have been created from 2 doorbell files and 1 noise file.

The data from the approximately 384 files may be fed into a blank neural network. For example, each node of the blank neural network has a multiplier, or weighting factor, that is randomly set and then optimized through training to generate a final neural network. Examples of training techniques include back propagation, iterative training, and other known techniques. In this example, the multiplier or weights may be determined or set by training the neural network using known back propagation training techniques. Using the back propagation training the final neural network is optimized for a particular exigent sound, such as a baby crying, an ambulance siren, doorbell or dog barking.

Returning to the example, each particular sound of interest may have a corresponding final neural network. The individual final neural networks may be built by selecting a neural network with preset multipliers from a library of preset neural network algorithms available from different software providers. Examples of neural network libraries available from different providers include Fast Artificial Neural Network (FANN), which is an open source C library of different neural networks, OpenNN, which is a C++ library of neural networks, and the like. The neural networks available from the libraries may be customized for a particular application, such as the sound notification application discussed herein.

For example, in the present sound recognition and notification application, the neural network, in some examples, may include approximately 900-1000 input nodes and approximately 5-6 hidden layers, and approximately one (1) output node for each sound to be detected. In other examples, the neural network may process more or less input nodes than approximately 1000 input nodes, and may have more or less than the approximately 5-6 hidden layers. This processing is performed prior to the sound notification apparatus entering a sound recognition mode to provide a notification of the detection of a selected sound. The above described specific example generates a large amount of data. For example, in the case of five hundred (500) different types of doorbell sounds with 500 noise files associated therewith, there are potentially 16 million files (e.g., 2×500× 500×8×4); each at 88 kB each that needs to be stored in memory.

Figure 3:
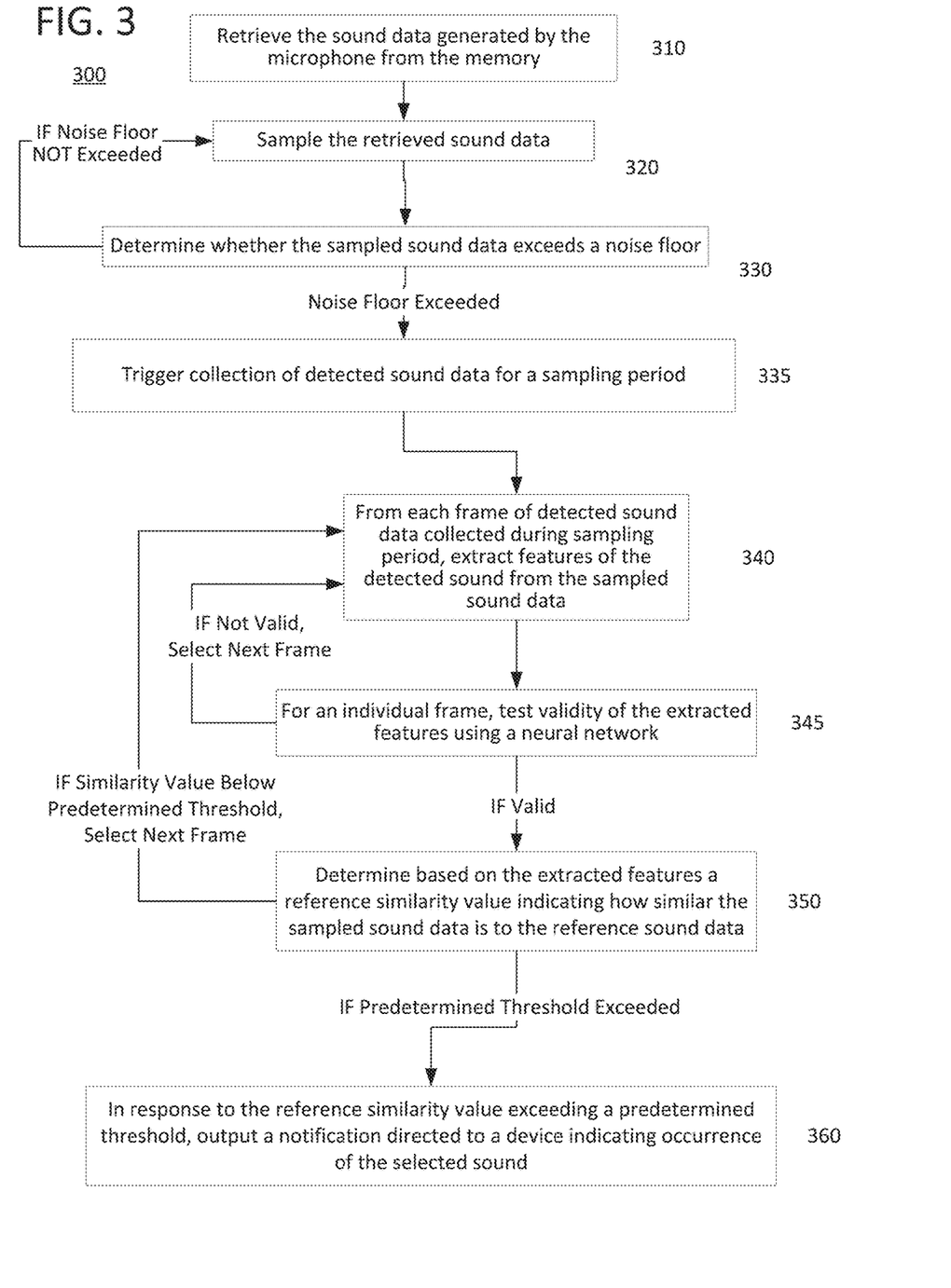
FIG. 3 is a flow chart of a high-level example of a process for recognizing sounds detected by a sound notification apparatus and generating notifications based on the recognition of the detected sound.

The sound notification apparatus is configured to detect a selected sound in the area of a premises based on the above described process 200. FIG. 3 is a flow chart of a high-level example of process for recognizing sounds detected by a sound notification apparatus and generating notifications based on the recognition of the detected sound An example, of the sound recognition and notification process will be described in more detail with reference to FIG. 3. Upon establishing the reference sound for the selected sound and entering the sound recognition mode, the sound detection circuit, such as 121, begins generating sound data from the detected sounds in the area of the apparatus. Since there are so many sounds that may be potentially detected by the microphone 121 some of which may be very far from the apparatus (e.g., a jet flying overhead), there is a need to establish a minimum intensity or loudness of a sound, i.e., a noise floor, to allow sounds below the noise floor to be ignored or discarded prior to being processed for sound recognition. Sounds determined based on sound data associated with the respective sounds to be above the noise floor are processed to identify whether the sound is the selected sound.

For example, in the process 300, the sound data generated by the microphone is obtained (310). The generated sound data may be obtained directly from a sound detection circuit, or may be buffered into a memory and retrieved by a processing device from the memory.

The retrieved, generated sound data is sampled by the processing device at 320. For example, the processing device may sample the retrieved generated sound data in short periods of time, such as a tenth of a second or multiples thereof such as $\frac{1}{20}^{th}$, $\frac{1}{30}^{th}$, or the like. These are referred to as frames, and whether the detected sound exceeds the noise floor is a frame-by-frame determination.

The sound data is processed, for example, to determine whether the sampled sound data exceeds a noise floor (330). The determination of whether a frame from the sampled sound data exceeds the noise floor is similar to the process described with reference to step 245 of FIG. 2 above. For example, the processing device may evaluate sound data in a single frame of the sampled sound to determine whether the noise floor has been exceeded. This allows the processor to determine whether an input sound exceeds the noise floor by analyzing the intensity of the sound on a frame-by-frame basis. When a frame is determined to exceed the noise floor the processor moves to 335; otherwise the process returns to step 320 and evaluates another sample of the sampled sound.

In response to the determination that the sampled sound exceeds the noise floor, the processor triggers the storage of detected sound data for a sampling period at 335. A sampling period may be a predetermined period of time, such as for example, 500 milliseconds, 1 second, 1.5 seconds, 3 seconds or the like. In a particular example, the sampling period is approximately 3.3 seconds. The sampling period of this example may be further subdivided into smaller time periods referred to as frames. For example, each 1 second portion of the 3.3 second sampling period may be divided into thirty (30) frames, in which case, one (1) frame is $\frac{1}{30}^{th}$ of a second in duration. The extra 0.3 seconds of the 3.3 second sample period are also subdivided into a frame, and processed. Alternatively, the number of frames may be more or less depending upon the sampling period. The number of samples collected during the sampling period may be from several hundred to tens of thousands, such as 40,000 or more. A neural network such as that described above may be used to evaluate the frames.

At 340, the processor extracts features related to the sound from the sampled sound data. The features may be extracted from each of the individual frames and may be placed in an array. The features extracted from each of the frames may include at least one of an attack value of the generated sound data, a sustain value of the generated sound data, a decay value of the generated sound data, or a frequency track of the generated sound data. Using the extracted features, the process 300 may determine whether the generated sound data is a selected sound that requires a notification to be output by the sound notification apparatus. In step 345, the validity of the features values extracted from the detected sound are tested to see if the extracted features are valid indicators that the detected sound is the selected sound.

For example, the extracted features values are input into the final neural network corresponding (i.e., a neural network having the weightings (or multipliers)) to the selected sound. As mentioned above, the output of the neural network is a neural network similarity value. If the neural network similarity value output from the neural network indicates that the retrieved sound data is similar to the selected sound to be recognized, the process 300 moves to step 350. Conversely, if the neural network similarity value output from the neural network indicates that the retrieved sound data is not similar to the selected sound to be recognized, the process 300 returns to step 330. Step 345 is advantageous as it provides an additional level of accuracy to the recognition result to mitigate the possibilities of erroneous notifications. After indicating at step 345 that the extracted features are indicative of a selected sound, the sound notification apparatus processing device may, for example, determine, based on the extracted features a similarity value indicating how similar the sampled sound data is to the reference sound data (350). Recall the reference sound data is the data extracted from the user's personal sound, e.g., the user's doorbell, the user's cry for "Help", the user's child crying and the like. As a second accuracy insurance step, the sound notification apparatus processor may at step 350, for example, generate a reference similarity value based on a comparison of the features extracted from the sound data and features of the reference sound. The reference similarity value provides an indication of how similar the sound data is to the reference sound. While in the sound recognition mode, at 350, the processor may also determine that the reference similarity value exceeds a predetermined threshold, which indicates that the features extracted from the sound data generated in response to the detection of the subsequent sound substantially matches the reference sound data. Should the reference similarity value not exceed the predetermined threshold at step 350, thereby indicating that this portion of the detected sound is not a match to features of the selected sound, the process 300 may return to step 330 for the next frame. In response to the reference similarity value exceeding the predetermined threshold, the sound notification apparatus processor may cause, at 360, the output of a notification message indicating an occurrence of the selected sound to an identified device capable of receiving a notification via the network transceiver.

For example, the network transceiver may transmit notifications formatted for non-audio output by the recipient device, such as an identified device, via a communication path with the data communication network. The network transceiver may communicate via a second radio frequency communication protocol, such as Wi-Fi, ZigBee, a cellular protocol or the like.

Figure 4:
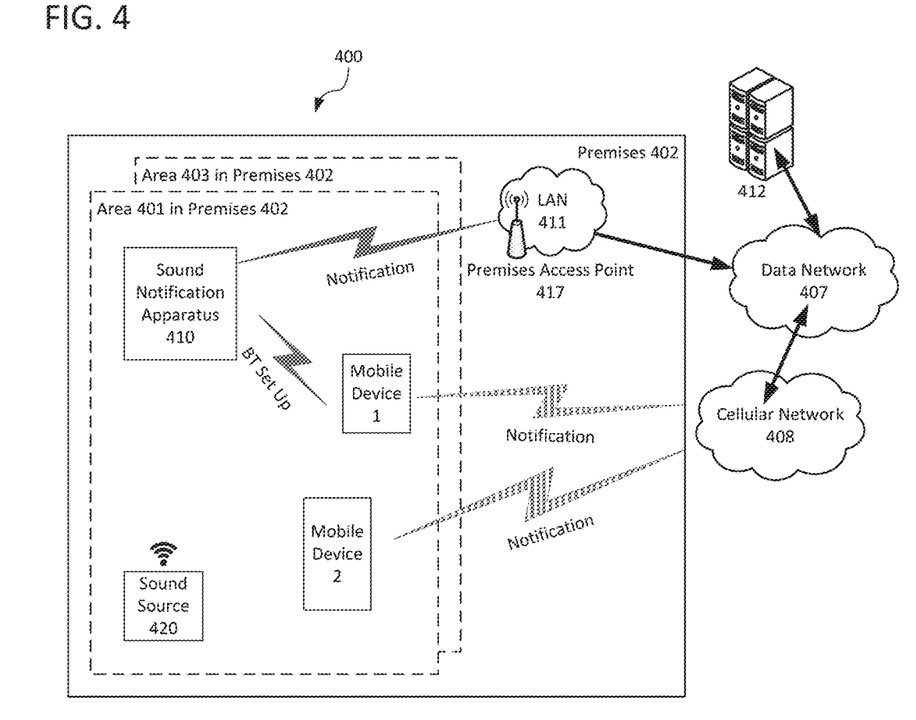
FIG. 4 is a high-level functional block diagram of an example of a system that incorporates the examples of FIGS. 1-3 to provide an example of a sound recognition and notification service.

The foregoing discussion described a sound notification apparatus, and processes for configuring and using the sound notification apparatus. It may be helpful to refer to a high-level system example to illustrate an example implementation and operation of an sound notification apparatus in a premises location. FIG. 4 illustrates a system including the sound notification apparatus 410 as configured in an area of a premises. The system 400 may include a sound notification apparatus 410 located in an area 401 of a premises 402. A premises 402 may be a home, office space, or other location suitable for human occupation. The area 401 as well as area 403 may be separate, indoor or outdoor places associated with the premises 402. For example, when the premises 402 is a home, the area 401 may be a kitchen, a foyer, a living room, a bathroom or the like, while area 403 may be a nursery, a child's play area, a swimming pool area, or the like.

The system 400 also includes communication networks. For example, the premises 402 may have a local area network (LAN) 411 accessible via a premises access point 417, such as a Wi-Fi access point. The LAN 411 may be coupled to a data network 407, such as the Internet, to which is coupled one or more servers 412. The data network 407 may be coupled to a cellular network, such as 408. Mobile devices 1 and 2 may be smart phones, tablets or similar devices configured to communicate via the cellular network 408 as well as via the LAN 411. The servers 412 may provide services such as the notification and user preference services as described above.

The sound notification apparatus 410 may plug into an electrical outlet (not shown) at an area 401 of a premises 402. There is no limit to the number of sound notification apparatus that may be installed in a premises. For example, another sound notification apparatus, similarly to sound notification apparatus 410, may be located in area 403 of premises 402.

As discussed above, the sound notification apparatus 410 may be plugged into an electrical outlet to power the sound notification apparatus 410. In the illustrated example, the mobile device 1 performs via a Bluetooth® (BT) communication pathway established between the mobile device 1 and the sound notification apparatus 410. The sound notification apparatus 410 and mobile device 1 perform a set up procedure, such as the set up procedure described with reference to FIG. 2.

The user of mobile device 1 when executing the process 200 of FIG. 2 to configure the sound notification apparatus 410 may identify another device, such as mobile device 2, which may be associated with a second use, who may be a hearing-impaired user. As such, the sound notification apparatus 410 may be configured to identify the mobile device 2 as at least one recipient device that is to receive non-audio notifications when the sound notification apparatus 410 is in a sound recognition mode.

After completion of the setup of the sound notification apparatus 410 by the mobile device 1, the sound notification apparatus 410 may be set to a sound recognition mode. In sound recognition mode, the sound notification apparatus 410 performs a process such as process 300 to detect selected sounds from a sound source 420, such as a baby, dog, elderly person, doorbell, washing machine or the like, in the area 401 of premises 402. Upon detection and identification of the selected sound, the sound notification apparatus 410 is configured to generate a notification in response to the identification of the selected sound from, for example, sound source 420. The sound notification apparatus 410 may transmit the notification to the premises access point 417 for transmission of the notification through the LAN 411 to the data network 407. At the data network 407, the notification may be transmitted to a server 412 that is executing a notification application associated with the sound notification apparatus 410. As explained above, the server 412 generates a notification that is transmitted to the intended recipient device, such as mobile device 2, via the cellular network 408. In the example of FIG. 4, the notification is sent to mobile device 2. Alternatively or in addition, if established during set up, the mobile device 1 may also receive the notification.

The notification is intended to attract the attention of a hearing-impaired person. Therefore, the notification is meant to cause the intended recipient device to present non-audible cues or non-audible actions that are known to attract attention to the device. For example, he notifications sent by sound notification apparatus 410 may include signals or codes that when received by an application executing on the intended recipient device, in this example, mobile device 2, cause the mobile device 2 to respond in a non-audible manner. For example, the mobile device may vibrate or other haptic output, flash a touchscreen or LED, generate a text notification on a touchscreen, or the like.

In a specific example, the notification sent in response to a doorbell ringing in a foyer may cause the intended recipient device, for example, a smartphone, a touchscreen of the smartphone to flash white light at maximum brightness, vibrate in a non-rhythmic manner and present the word "DOORBELL" or "DOORBELL in the FOYER," in case there is a second location. Similarly, a notification for someone crying "Help" may cause the touchscreen to flash red light at maximum brightness, vibrate in a rhythmic manner and present the word "HELP in the child's play area!" Of course, other examples or actions may be caused to be presented by the intended recipient device.

While the notifications in the foregoing example were described as being transmitted via the cellular network 408, the notifications may have been sent via the data network transceiver 123 of the sound notification apparatus to mobile device 2 via the data network 407 and the LAN 411.

Figure 5:
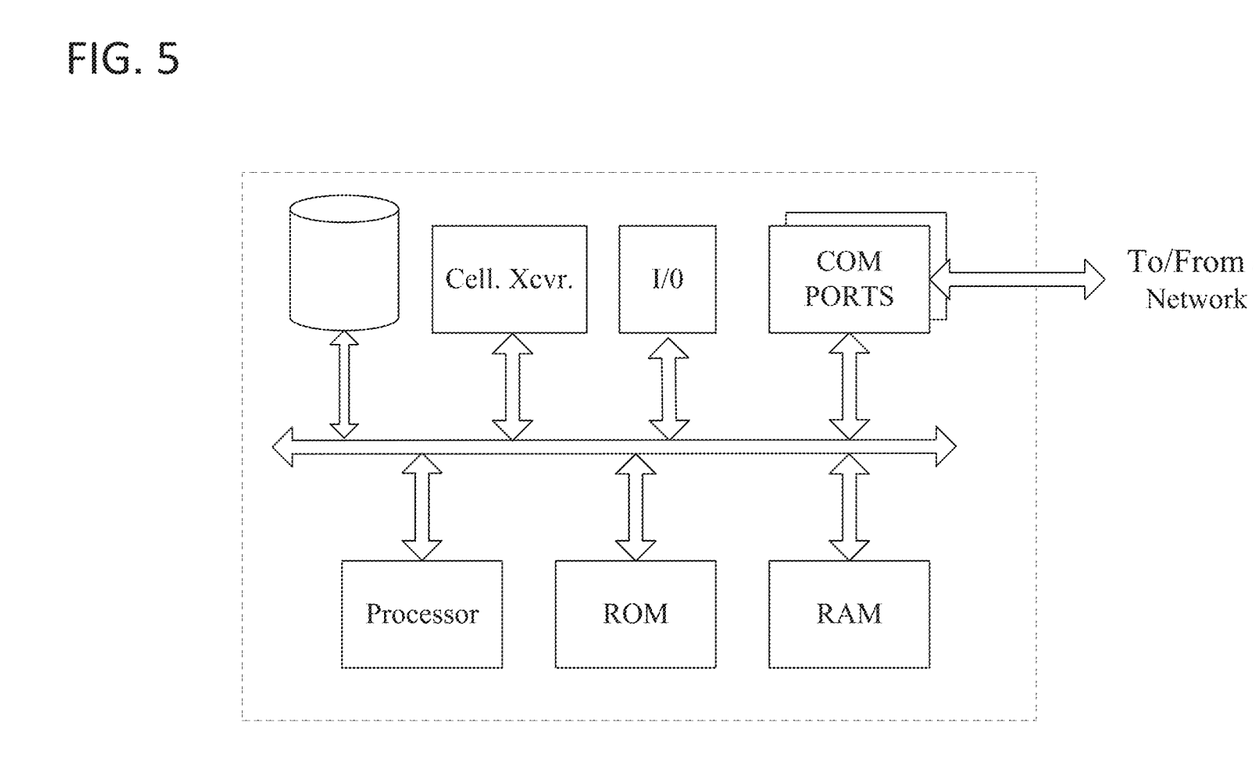
FIG. 5 is a simplified functional block diagram of a computer that may be configured to function as the sound notification apparatus in the system of FIG. 4.

FIG. 5 provides a functional block diagram illustrations of general purpose computer hardware platform usable, for example, as a sound notification device. It is believed that the general structure and general operation of such equipment as shown in FIG. 5 should be self-explanatory from the high-level illustration.

The sound notification apparatus also includes one or more processors for executing program instructions. The sound notification apparatus typically includes an internal communication bus, program storage and data storage for various data files to be processed and/or communicated by the sound notification apparatus, although the sound notification apparatus often receives programming and data via network communications and/or apparatus inputs or outputs (I/O), e.g., sound detection circuits. The hardware elements, operating systems and programming languages of such sound notification apparatuses are conventional in nature. Of course, the sound notification apparatus functions may be implemented in a distributed fashion on a number of similar platforms, to distribute the processing load.

For example, the sound notification apparatus may include a touchscreen display, for example, as user interface 145. that enables input and output of information. Alternatively, the sound notification apparatus may include indicator lights, such as light emitting diodes (LEDs) that provide indications to a user. A microphone enables audio input. For example, the sound notification apparatus may use an electret microphone; which uses a thin membrane that vibrates in response to the received airwaves, and generates an audio signal in direct relation to the received airwaves. The audio signal may amplified by an amplifier, for example by about 300×. A filter may filter the amplified audio signal to remove all frequencies below approximately 100 Hz and above approximately 15 kHz.

Aspects of the methods of the sound notification service outlined above may be embodied in programming, for example, for execution by the processor of the sound notification apparatus 101. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the sound notification service provider into a mobile device of a user prior to setup of the sound notification apparatus as described above. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the sound notification service, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus, comprising:
a housing;
a wireless transceiver configured to communicate via a first radio frequency communication protocol;
a sound detection circuit comprising a microphone and a converter coupled to the microphone, the sound detection circuit configured to:
detect sound in an area of a premises in which the apparatus is located, and
generate sound data based on the detected sound;
a memory storing programming instructions and one or more simplified sound models; and
a processor coupled to the sound detection circuit, the wireless transceiver and the memory, the processor when executing the programming instructions is configured to:
establish a communication path with a portable device via the wireless transceiver;
identify the portable device as at least one intended recipient device to receive notifications from the apparatus when the apparatus is in a sound recognition mode;
send, via the communication path, a request to the portable device requesting selection of an exigent sound of interest to a hearing-impaired person;
upon receiving from the portable device an exigent sound selection in response to the request, retrieve a pre-stored, simplified sound model corresponding to the exigent sound selection from the memory;
receive sound data generated by the sound detection circuit in response to sound detected in the area of the premises in which the apparatus is located;
compare the generated sound data received from the sound detection circuit to the retrieved, simplified sound model corresponding to the exigent sound selection;
in response to a result of the comparison indicating that the generated sound data is similar to the simplified sound model corresponding to the exigent sound selection, extract features from the generated sound data;
store the extracted features in the memory as reference sound data for the selected exigent sound; and
enter a sound recognition mode to monitor the area of the premises in which the apparatus is located to recognize an occurrence of an exigent sound that, based on the reference sound data, is similar to the selected exigent sound,
wherein the processor, the memory, the sound detection circuit and the wireless transceiver are coupled together within the housing.

2. The apparatus of claim 1, wherein the extracted features include at least one of an attack value of the generated sound data, a sustain value of the generated sound data, a decay value of the generated sound data, or a frequency track of the generated sound data.

3. The apparatus of claim 1, wherein when the apparatus is in the sound recognition mode:
the processor, upon execution of program instructions stored in the memory, is further configured to:
retrieve sound data generated by the sound detection circuit over a predetermined amount of time from a memory
sample the sound data retrieved from the memory;
determine whether the sampled sound data retrieved from memory exceeds a noise floor;
in response to the determination that the sampled sound data retrieved from memory exceeds the noise floor, extract features from the sampled sound data retrieved from memory;
determine a reference similarity value between the features extracted from the sampled retrieved sound data and the extracted features of the reference sound data, the reference similarity value indicating how similar the generated sound data is to the reference sound data for the selected exigent sound;
in response to the reference similarity value exceeding a predetermined threshold, output a notification to a device capable of receiving a notification via a network transceiver, the notification indicating an occurrence of the selected exigent sound.

4. The apparatus of claim 3, wherein when extracting features from the sampled retrieved sound data, the processor is further configured to:
identify features of the sampled retrieved sound related to at least one of the attack of the sound represented by the sampled sound data, the sustain of the sound represented by the sampled sound data, the decay of the sound represented by the sampled sound data, or tracking of the frequency of the sound represented by the sampled data.

5. The apparatus of claim 3, wherein prior to determining the reference similarity value between the features extracted from the sampled retrieved sound data and the extracted features of the reference sound data, the processor is further configured to:
test the validity of the extracted features of the sampled sound using a neural network; and
receive an indication of that the extracted features are valid for the sampled sound.

6. The apparatus of claim 1, wherein, after entering the sound recognition mode, the processor is further configured to:
calculate an average sound energy from sound collected during a preset window of time;
set a noise floor value based upon the calculated average sound energy, wherein the noise floor value is a minimum sound energy value that is equal to the predetermined sound energy;
sample additional sound data received from the sound detection circuit;
determine that the sampled additional sound data exceeds the noise floor value; and
in response to the sampled additional sound data exceeding the noise floor value, compare the sampled additional sound data to the reference sound data.

7. The apparatus of claim 1, wherein the first radio frequency protocol is a Bluetooth standard compatible protocol.

8. The apparatus of claim 1, wherein the network transceiver is a Zigbee transceiver, a Wi-Fi transceiver, or a cellular radio frequency transceiver.

9. The apparatus of claim 1, wherein the processor, upon execution of program instructions stored in the memory, is further configured to:
search an local area network using the network transceiver for a device capable of receiving notifications of a subsequent detection of the selected sound;
after locating a device capable of receiving notifications via the network transceiver, confirming via the communication path with the portable device that the located device is a permitted to receive notifications; and
upon receipt of the confirmation, close the communication path with the portable device.

10. The apparatus of claim 1, wherein the processor, upon execution of program instructions stored in the memory, is further configured to:
update the simplified model based on the stored reference data of the matching sound.

11. The apparatus of claim 10, wherein the processor, when updating the simplified model of the selected sound using the reference sound data, is further configured to:
incorporating the extracted features from the generated sound data of the detected exigent sound into the simplified model to produce a supplemented model, wherein the supplemented model further distinguishes the generated sound data as the selected sound; and
store the supplemented model in the memory.

12. The apparatus of claim 11, wherein when extracting features to update the simplified model, the processor is further configured to:
identify features of the sampled sound related to at least one of the attack of the sound represented by the sampled data, the sustain of the sound represented by the sampled data, the decay of the sound represented by the sampled data, or tracking of the frequency of the sound represented by the sampled data.

13. The apparatus of claim 1, further comprising:
a wall plug coupled to the housing and configured to be inserted into an electrical outlet from which the apparatus receives electrical power.

14. The apparatus of claim 1, further comprising:
a network transceiver, different from the wireless transceiver, coupled to the housing, and configured to couple to a data communication network, wherein:
the network transceiver transmits notifications formatted for non-audio output by the recipient device via a communication path with the data communication network, and
the network transceiver communicates via a second radio frequency communication protocol.

15. A method, comprising:
establishing a communication path between a portable device and a sound notification apparatus via a wireless transceiver of the sound notification apparatus;
in response to receiving by the sound notification apparatus a selection of an exigent sound, retrieve from a memory of the sound notification apparatus a pre-stored, simplified sound model corresponding to the selected exigent sound;
receiving sound data generated by a sound detection circuit of the sound notification apparatus in response to detecting a sound in an area of a premises where the sound notification apparatus is located;
comparing by a processor of the sound notification apparatus the generated sound data to the retrieved simplified model;
in response to a result of the comparison indicating that the generated sound data is similar to the simplified model, extracting features from the generated sound data;
storing the extracted features from the generated sound data as reference sound data for the selected exigent sound in the memory; and
entering a sound recognition mode to monitor the area of the premises to recognize a subsequent occurrence of an exigent sound that, based on the reference sound data, is similar to the selected exigent sound.

16. The method of claim 15, further comprising:
identifying the portable device as at least one recipient device to receive non-audio notifications from the sound notification apparatus, when the sound notification apparatus is in a sound recognition mode;
while the sound notification system is in the sound recognition mode:
retrieving sound data generated by the sound detection circuit from the memory;
sampling the retrieved sound data;
determining whether the sampled sound data exceeds a noise floor;
in response to the determination that the sampled sound exceeds the noise floor, extracting features from the sampled sound data;
determining based on the features extracted from the sampled sound data a similarity value indicating how similar the sampled sound data is to the reference sound data; and
in response to the similarity value exceeding a predetermined threshold, outputting a notification directed to the identified portable device.

17. The method of claim 15, further comprising:
upon establishing the communication path via the wireless transceiver, receiving information related to the area in which the sound notification apparatus is located.

18. The method of claim 15, wherein extracting features from the generated sound data, further comprises:
identifying features of the sampled sound related to at least one of an attack value of the generated sound data, a sustain of the generated sound data, a decay of the generated sound data, or a frequency track of the generated sound data.

19. The method of claim 15, further comprising:
prior to determining the reference similarity value between the features extracted from the sampled retrieved sound data and the extracted features of the reference sound data, determining that the extracted features are valid by testing the validity of the extracted features of the sampled sound using a neural network; and
receiving an indication of that the extracted features are valid for the sampled sound.

20. A sound notification apparatus, comprising:
a housing;
a wall plug coupled to the housing and configured to be inserted into an electrical outlet from which the apparatus receives electrical power;
a wireless transceiver configured to communicate via a first radio frequency communication protocol;

a sound detection circuit configured to:
  detect a sound in an area in which the apparatus is receiving electrical power, and
  generate sound data based on the detected sound;
a memory storing programming instructions and a set of simplified sound models; and
a processor coupled to the sound detection circuit, the transceiver and the memory within the housing, the processor when executing the programming instructions is configured to:
  establish a communication path with a portable device via the wireless transceiver to conduct a sound notification apparatus setup;
  request selection of a sound of interest to a hearing-impaired person for the sound notification apparatus setup;
  in response to receiving a sound selection, retrieve a simplified sound model of the selected sound from the set of simplified sound models stored in the memory, the simplified sound model having additional sound-related information including an area of a premises in which the selected sound is most probable to occur;
  sample sound data of a sound detected by the sound detection circuit that exceeds a noise floor; and
  compare the sampled sound data to the retrieved simplified model of the selected sound;
  in response to the comparison indicating a substantial match between the sampled sound data and the simplified model of the selected sound, extract features from the sampled sound that uniquely identify the sampled sound as the selected sound;
  store the extracted features in the memory;
  enter a sound recognition mode to notify an identified device of detection of the selected sound based upon data generated from a subsequent sound substantially matching the extracted features; and
  in response to detection of data generated from the subsequent sound substantially matching extracted features while in the sound recognition mode, output a notification message indicating an occurrence of the selected sound for transmission to the identified device.

21. The apparatus of claim 20, further comprising:
a network transceiver coupled to a data communication network, wherein the transceiver communicates via a wired or wireless communication path with the data communication network, wherein the wireless communication path utilizes a second radio frequency communication protocol; and
the network transceiver is configured:
transmit the notification output by the processor to the identified device.

22. The apparatus of claim 20, wherein the processor, upon execution of program instructions stored in the memory, is further configured to:
  search a local area network for a device different from the portable device that is capable of receiving notifications of subsequent detection of the selected sound;
  after locating a device capable of receiving notifications, storing an identifier of located device as the identified device; and
  close communication path with the portable device.

23. The apparatus of claim 20, wherein the processor, upon execution of program instructions stored in the memory, is further configured to:
  extract features from the sampled sound data by identifying features of the sampled sound related to at least one of the attack of the sampled data, the sustain of the sampled data, the decay of the sampled data, or tracking of the frequency of the sampled data.

* * * * *